(12) United States Patent
Chang et al.

(10) Patent No.: US 9,146,972 B2
(45) Date of Patent: Sep. 29, 2015

(54) RANKING OF PRESENTATION MODES FOR PARTICULAR CONTENT

(71) Applicant: Google Inc., Mountain View, CA (US)

(72) Inventors: Lawrence Chang, Foster City, CA (US); Chaesang Jung, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 201 days.

(21) Appl. No.: 13/832,720

(22) Filed: Mar. 15, 2013

(65) Prior Publication Data

US 2015/0169703 A1    Jun. 18, 2015

(51) Int. Cl.
*G06F 17/30* (2006.01)

(52) U.S. Cl.
CPC ............................. *G06F 17/30554* (2013.01)

(58) Field of Classification Search
CPC .................................................. G06F 47/30554
USPC ........................... 707/706, 707, 723, 748, 752
See application file for complete search history.

(56) References Cited

U.S. PATENT DOCUMENTS

| | | | | |
|---|---|---|---|---|
| 7,617,225 | B2 | 11/2009 | Arrouye | |
| 8,086,957 | B2 | 12/2011 | Bauchot | |
| 8,326,826 | B1 * | 12/2012 | Upstill et al. | 707/723 |
| 8,458,384 | B2 | 6/2013 | Johnson | |
| 8,484,187 | B1 * | 7/2013 | Hong et al. | 707/706 |
| 8,510,764 | B1 | 8/2013 | Deselaers | |
| 8,515,979 | B2 | 8/2013 | Mehta | |
| 8,554,345 | B2 | 10/2013 | Fernandez | |
| 8,583,675 | B1 * | 11/2013 | Haahr et al. | 707/767 |
| 8,595,450 | B2 | 11/2013 | Nguyen | |
| 2004/0030882 | A1 | 2/2004 | Forman | |
| 2005/0177562 | A1 | 8/2005 | Raciborski | |
| 2007/0209080 | A1 | 9/2007 | Ture | |
| 2009/0150363 | A1 | 6/2009 | Gross et al. | |
| 2009/0241135 | A1 | 9/2009 | Wong et al. | |
| 2010/0082661 | A1 | 4/2010 | Beaudreau | |

(Continued)

FOREIGN PATENT DOCUMENTS

| EP | 2474905 A2 | 7/2012 |
|---|---|---|
| EP | 2495670 A1 | 9/2012 |

OTHER PUBLICATIONS

Sandhya et al., Efficient Web Crawling With Proposed URL Ordering, 2011, IEEE, 44-47.*

(Continued)

*Primary Examiner* — Jean B Fleurantin
(74) *Attorney, Agent, or Firm* — Fish & Richardson P.C.

(57) ABSTRACT

Methods, systems, and apparatus, including computer programs encoded on a computer storage medium, for scoring and ranking environmental views of particular content. In an aspect, a method determines, for each presentation mode of a content item, a presentation mode score for the presentation mode based on presentation mode signals, each presentation mode score being an indicator of quality of the presentation mode; selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode.

17 Claims, 5 Drawing Sheets

(56) References Cited

U.S. PATENT DOCUMENTS

| | | |
|---|---|---|
| 2010/0257466 A1 | 10/2010 | Wroblewski |
| 2010/0306191 A1 | 12/2010 | LeBeau |
| 2011/0153712 A1 | 6/2011 | Whetsel |
| 2011/0252038 A1 | 10/2011 | Schmidt |
| 2011/0307463 A1 | 12/2011 | Kasterstein et al. |
| 2011/0314004 A1 | 12/2011 | Mehta |
| 2012/0110174 A1 | 5/2012 | Wootton et al. |
| 2012/0124061 A1 | 5/2012 | Macbeth |
| 2012/0158893 A1 | 6/2012 | Boyns et al. |
| 2012/0179706 A1 | 7/2012 | Hobbs |
| 2012/0179955 A1 | 7/2012 | French |
| 2012/0254776 A1 | 10/2012 | Corella et al. |
| 2012/0290584 A1 | 11/2012 | De Bona et al. |
| 2012/0316955 A1 | 12/2012 | Panguluri |
| 2012/0323898 A1 | 12/2012 | Kumar |
| 2013/0006897 A1 | 1/2013 | Jain |
| 2013/0110815 A1 | 5/2013 | Tankovich |
| 2013/0111328 A1 | 5/2013 | Khanna |
| 2013/0122861 A1 | 5/2013 | Kim |
| 2013/0124606 A1 | 5/2013 | Carpenter |
| 2013/0191360 A1 | 7/2013 | Burkard |
| 2013/0232256 A1 | 9/2013 | Lee |
| 2013/0298007 A1 | 11/2013 | Cullen |
| 2013/0325856 A1 | 12/2013 | Soto |

OTHER PUBLICATIONS

International Search Report and Written Opinion in International Application No. PCT/US2014/011256, mailed Apr. 15, 2014, 12 pages.

"Deeplink.me Lets Mobile Users Navigate Through a "Web" of Apps," [online][Retrieved on Dec. 13, 2013]; Retrieved from the Internet URL: techcrunch.com/2013/05/22new-service-called-deeplink-me-will-let-mobile-users-navigate-through-a-web-of-apps/; 8 pages.

"Google's Search Results Can Deep-Link to Your Android Apps," [online] [Retrieved on Dec. 13, 2013]; Retrieved from the Internet URL: techcrunch.com/2013/10/31/android-4-4-kitkat-app-indexing/; 6 pages.

"How to get a deep link of my application from the Windows Phone Marketplace using .NET code?," [online] [Retrieved on Dec. 13, 2013]; Retrieved from the Internet URL: stackoverflow.com/questions/13639564/how-to-get-a-deep-link-of-my-application-from-the-windows-phone-marketplace-usin; 2 pages.

"Indexing apps just like websites," [online] [Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online] [Retrieved on Dec. 16, 2013]; Retrieved from the Internet URL: chrome.blogspot.jp/2011/instant-pages-on-google-chrome.html; 3 pages.

"Mobile deep linking," [online] [Retrieved on Dec. 13, 2013]; Retrieved from the Internet URL: en.wikipedia.org/wiki/Mobile_deep_linking; 2 pages.

"Ready for a "Web" of Apps? Quixey Launches AppURL, A New Way to Enable Deep Linking Across Mobile Applications," [online] [Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

Google Play Store [online]. [retrieved on Mar. 11, 2013]. Retrieved from the Internet: <URL: https://play.google.com/store>, 3 pages.

"Visability for Your Apps/Android Developers" Developer.Andriod.com [online]. [retrieved on Mar. 11, 2013]. Retrieved from the Internet: <URL: http://developer.android.com/distribute/googleplay/about/visibility.html>, 6 pages.

Klais, "5 SEO Tips to Get Mobile Apps Ranked in SERPs," Search Engine Land [online], Dec. 19, 2011 [retrieved on Mar. 11, 2013]. Retrieved from the Internet: <URL: http://searchengineland.com/5-seo-tips-to-get-mobile-apps-ranked-in-serps-104595>, 6 pages.

"Adding deep linking to Google+ posts shared from your iOS app," [online][Retrieved on Jan. 7, 2014]; Retrieved from the Internet URL: https://developers.google.com/+/mobile/ios/share/deep-link; 3 pages.

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2014/021315, mailed Jun. 27, 2014, 11 pages.

Lin et al., "SPADE: Scalable App Digging with Binary Instrumentation and Automated Execution," Jan. 1, 2013, pp. 1-12, Technical Report MSR-TR-2013-126 Retrieved from the Internet: URL:http://research.microsoft.com/pubs/206889/main.pdf [retrieved on Oct. 17, 2014].

Amalfitano et al, "A GUI Crawling-Based Technique for Android Mobile Application Testing," Software Testing, Verification and Validation Workshops (ICSTW), 2011 IEEE Fourth International Conference on, IEEE, Mar. 21, 2011, pp. 252-261.

International Search Report and Written Opinion in International Application No. PCT/US2014/041218, mailed Oct. 29, 2014, 13 pages.

\* cited by examiner

RANKING OF PRESENTATION MODES FOR PARTICULAR CONTENT

BACKGROUND

This specification describes technologies relating to scoring and ranking environmental views of particular content.

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular web page resources accessible over the Internet. With the advent of tablet computers and smart phones, native applications that facilitate the performance of the same functions facilitated by the use of web page resources are now being provided in large numbers.

A user's informational need may thus be satisfied by providing search results that identify either one (or both) of a particular web page resource or a native applications that facilitates the performance of the same functions facilitated by web page resource, or presents the same or very similar information as the web page resource.

SUMMARY

In general, one innovative aspect of the subject matter described in this specification can be embodied in methods that include the actions of receiving, by the data processing apparatus, data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that may be instantiated on a user device when a search result for the content item is selected; determining, for each presentation mode of the content item, a presentation mode score for the presentation mode based on presentation mode signals, each presentation mode score being an indicator of quality of the presentation mode; selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Ranking the possible presentation modes of the content ensures that a user will access the content according to the presentation mode that is determined to be of the best overall quality for the user device. The user need not seek multiple different presentation modes, thereby decreasing the amount of time required for the user to satisfy his or her informational need. Furthermore, no single presentation mode is always better than other presentation modes; presentation mode quality is determined based of a set of global signals and user device specific signal. For example, one publisher may have a better mobile web site than mobile native application; another publisher may have a better desktop web site than mobile web site; and so on. The system ranks the presentation modes on case by case basis so users receive the search result with a presentation mode that is determined to be of the highest quality relative to other presentation modes for the particular content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Particular content that is responsive to a query may have multiple different presentation modes. The content that is determined to be responsive to the query is referred to as a content item. Each presentation mode for the content item is specific to one of an application and a user device type and defines a presentation environment that may be instantiated on a user device when the search result is selected. For example, a particular content provider, such as a movie database, may have a desktop website, a mobile website, a mobile phone native application, and a tablet computer native application that each provides access to a movie database content item. Each of the desktop website, mobile website, mobile phone native application, and tablet computer native application has a corresponding "presentation mode," which is a presentation environment of the respective desktop website, mobile website, mobile phone native application, and tablet computer native application.

For each presentation mode, the system determines a presentation mode score for the presentation mode based on presentation mode signals. Each presentation mode score is an indicator of quality of the presentation mode. The signals may include the speed, stability and responsiveness of each presentation environment of each presentation mode; whether the user device has software installed that supports the presentation mode; the popularity of each presentation mode; and so on. The system then selects the presentation mode having presentation mode score indicating a highest quality relative to the quality indicated to the other presentation modes by the other presentation mode scores, and provides search results to a user device for presentation according to the presentation order. The search result referencing the content item having the multiple presentation modes is provided according to the selected presentation mode.

Operation of the system that indexes application page data and the processing of search results for application pages is described in more detail below.

Figure 1:
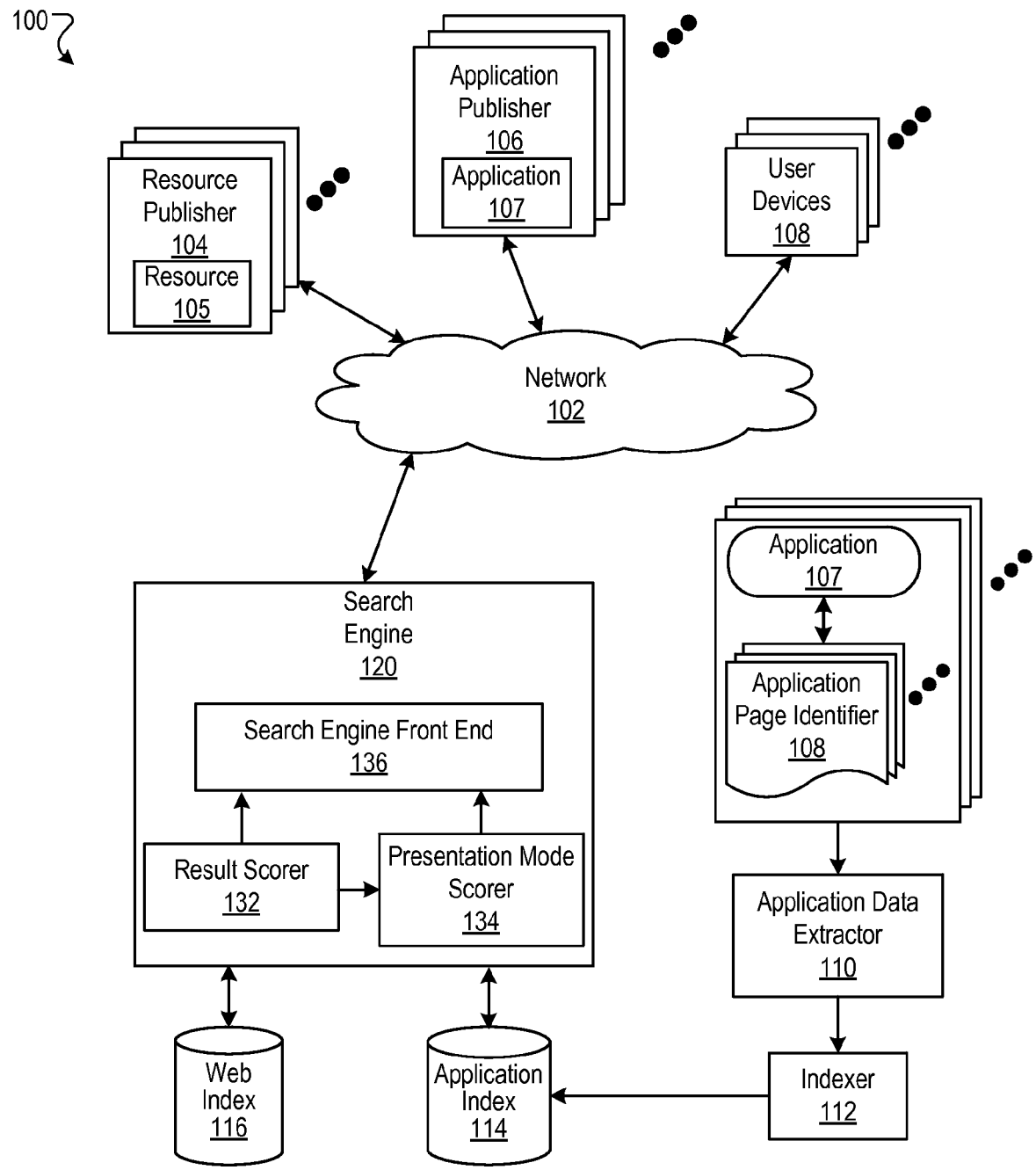
FIG. 1 is a block diagram of an example environment in which presentation modes for a content item are ranked and a particular presentation mode is selected for a search result referencing the content item.

FIG. 1 is a block diagram of an example environment 100 in which presentation modes for a content item are ranked and a particular presentation mode is selected for a search result referencing the content item. A computer network 102, such as the Internet, connects resource publisher web sites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts.

An application publisher website 106 may also include one or more web resources 105, and also provides native applications 107. A native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

An application page is a particular display environment within a native application and in which is displayed content, such as text, images, and the like. An application page is specific to the particular native application, and the native application is specific to the particular operating system of the user device 108. An application page differs from a rendered web resource in that the application page is generated within and specific to the native application, while a web resource may be rendered in any browser for which the web page resource is compatible, and is independent of the operating system of the user device. A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 112 and an application index 114. The web index 112 is an index of web resources 105 that has, for example, been built from crawling the publisher web sites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 112 and the application index 114 to identify resources and applications, respectively, that are relevant to the query. The search engine 120 implements a result scorer 132 process to generate content scores for content, where each content score is a measure of relevance of the content to the query. A variety of appropriate search engine algorithms can be used to implement the result scorer 132. For example, the search engine algorithm may be configured to score the native application content and web page resource content on a common scale so that each may be ranked against each other.

Particular content that is relevant to a query may be presented by a publisher by multiple different presentation modes. As described above, particular content may be provided for a desktop website, a mobile-optimized web site, and by multiple different native applications. As this content may be very similar or the same, the content can be considered to have multiple different presentation modes. Providing a single search result for each content item, however, may not satisfy a user's informational need, because doing may result in the user being provided with search results that have redundant substantive content. Furthermore, some of the presentation modes may not be supported for the particular user device.

According, for particular content that is accessible by multiple different presentation modes, the presentation mode scorer 134 determines a presentation mode score for each presentation mode based on presentation mode signals. Each presentation mode score is an indicator of quality of the presentation mode. The search engine front end 136 then selects, for the search result, the presentation mode having a presentation mode score indicating a highest quality relative to the quality indicated to the other presentation modes by the other presentation mode scores. The selected presentation mode is used to generate the search result for the particular information, and the search engine front end 136 that provides the search results to a user device 108 for presentation according to a presentation order.

The search results may be, for example, web resource search results and native application search results. A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114 of application pages. A variety of functions can be invoked by the selection of an application search result. For example, selection of a native application search result may cause the native application to launch (if installed on the user device 108) and generate an instance of application page referenced in the application search result and that includes content that is relevant to the search query. Such a function is referred to as "deep linking" within the application search result. Other types of search results appropriate for corresponding presentation modes can also be provided.

Figure 2:
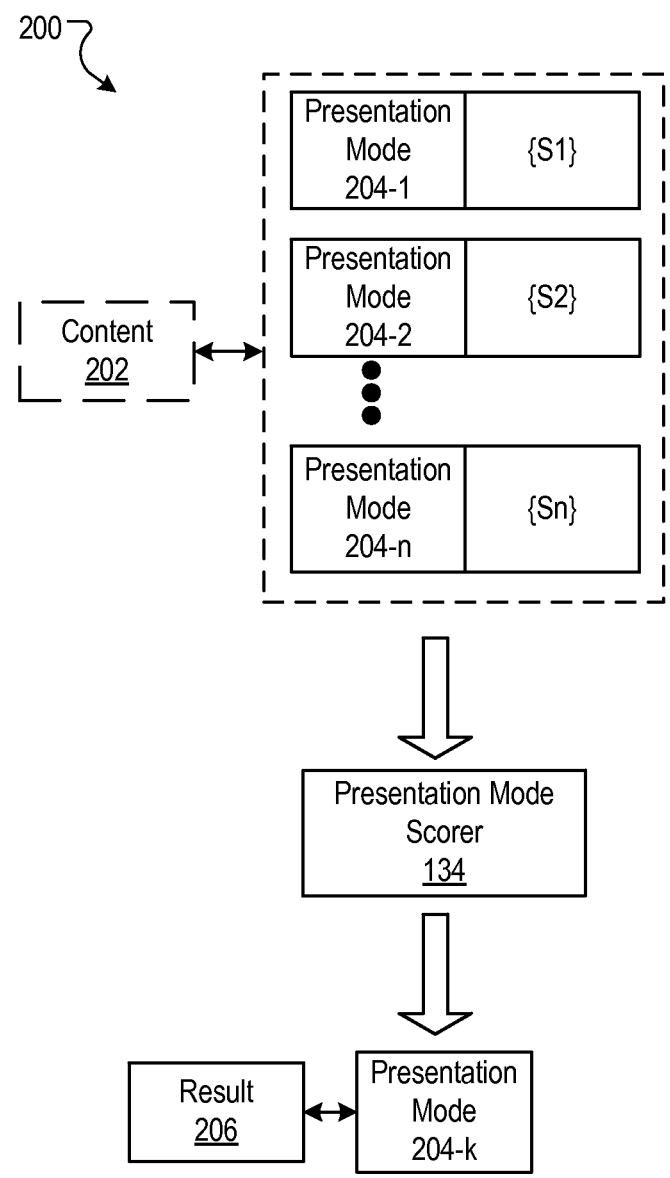
FIG. 2 is a system flow diagram of scoring presentation modes and selecting a presentation mode based on the presentation mode scores.
Figure 3:
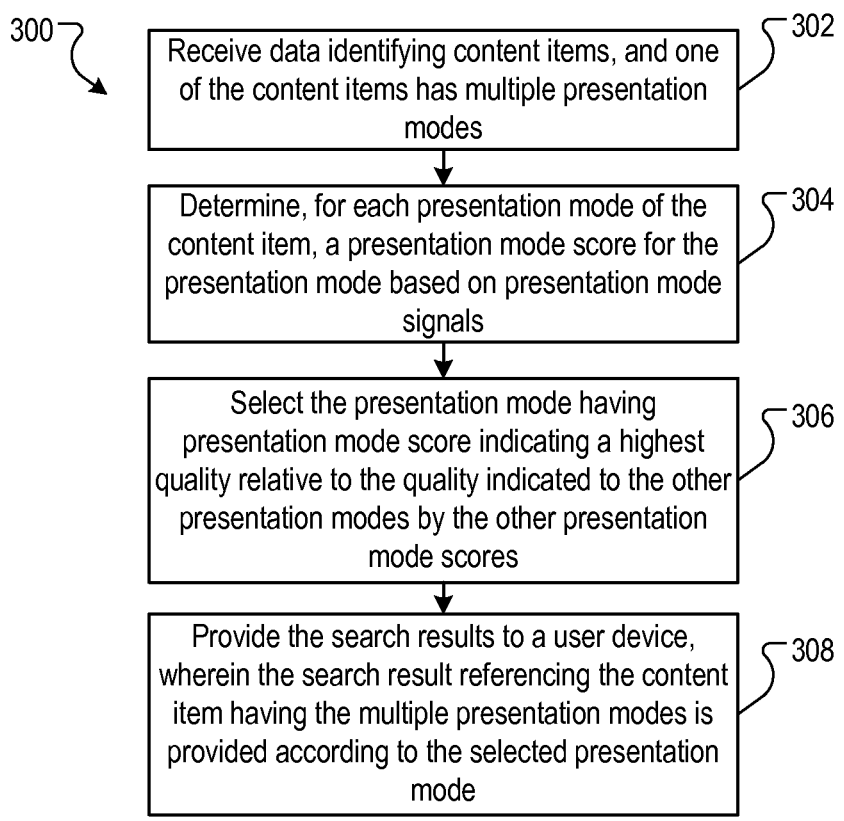
FIG. 3 is a flow diagram of an example process of scoring and selecting presentation modes.

FIG. 2 is a system flow diagram of scoring presentation modes and selecting a presentation mode based on the presentation mode scores. The system flow diagram 200 is described with reference to FIG. 3, which is a flow diagram 300 of an example process of scoring and selecting presentation modes. The process 300 can be implemented in a data processing apparatus of one or more computers that are in data communication.

The process 300 receives data identifying content items, and one of the content items has multiple presentation modes (302). Each content item corresponds to data determined to be responsive to the query and ranked according to a presentation order. To determine if a content item has multiple presentation modes, the search engine 120 can, for example, access the web index 116 and the application index 114 and compare URL addresses of web resources and URI addresses of native application pages. URLs and URIs with matching features (e.g., matching domain names) may be determined to be indicative of content having multiple presentation modes. Alternatively, or in addition, certain native applications may be specified by the application publisher 106 to correspond with certain web sites, and different versions of the same website, such as mobile websites, tablet websites, desktop websites, agent specific websites, etc. For example, a set of native applications for a weather web site may be published by the web site publisher and identified as corresponding to the web site. Other appropriate ways of determining whether particular content has multiple presentation modes can also be used.

As shown in FIG. 2, particular content 202 has multiple different presentation modes 204-1 . . . 204-n. The process 300 determines, for each presentation mode of the content item, a presentation mode score for the presentation mode based on presentation mode signals (304). Each presentation mode score is an indicator of quality of the presentation mode. The presentation mode signals can include global signals that are indicative of global presentation mode quality that is independent of a user device and user device specific signal that are indicative of presentation mode quality for a particular user device and user device type. As shown in FIG. 2, each presentation mode 204-1 . . . 204-n has corresponding presentation mode signals {S1} . . . {Sn}.

Examples of global signals include a presentation mode selection rate, a presentation environment quality score, presentation mode latency, presentation mode error measure, a presentation reversion rate, and other appropriate signals that may be independent of a particular device type. For example, the presentation mode scorer 134 may be configured to generate a presentation mode score in proportion to the selection rate of the presentation mode. The selection rate indicates a selection rate of the search result when the content is presented in a particular presentation mode, and may be indicative of how well the presentation mode satisfies users' informational needs.

The presentation environment quality score for the presentation mode is indicative of a quality of the presentation environment. This may be determined, for example, by raters, or by a machine learned process that is trained to generate a quality score based on extracted features of a presentation environment and corresponding weights.

Presentation mode latency is a measure of latency of the presentation mode when responding to user device requests. The presentation mode latency for each presentation mode can be determined, for example, from a virtual machine executing software that instantiates each presentation mode. The virtual machine may be programmed to generate common commands for each view, such as an initial content request, and various menu selections. For each command executed, the responsiveness of data provisioning for the presentation mode is measured.

The presentation mode error measure is a measure of errors that occur on a user device when the presentation environment for the presentation mode is instantiated. For example, a native application that may have several bugs, and may result in several errors. Likewise, a mobile website that is highly optimized may have very few, or perhaps no errors. Thus, the presentation mode of the mobile website may be rate higher than the presentation mode of the native application, if the presentation mode score is based only on the error measure.

The presentation mode reversion rate for a view mode is a rate at which a user reverts, within a predefined period of time, back to the search results interface after invoking a view mode. Generally, the higher the reversion rate for the view mode, the lower the resulting view mode score will be.

User device specific signals can, for example, be taken into account at query time. Examples of user device specific signals include installation status, operating system status, and user device type. Other appropriate user device signals can also be used.

Installation status is determined from whether a user device has a particular native application or browser software for the particular presentation mode installed on the user device. If necessary software is installed, the system may increase the presentation mode score for that particular user device relative to other user devices that do not have the software installed.

The operating system status describes the current level of the operating system. Often certain applications may require a minimum operating system version, or may alternatively be deprecated beyond the minimum operating system version. For example, an application may require the latest operating system upgrade for a particular tablet operating system. If the tablet does not have the latest operating system installed, then the presentation mode score for the application for that particular user device is decreased.

Likewise, the device type may also be taken into account. For example, a device type of "mobile" such as a mobile phone, may have several presentation modes available. However, the mobile website presentation mode may be the most responsive and stable presentation mode of all presentation modes available for the mobile phone. In this situation, the mobile web site presentation mode may have the highest resulting presentation mode score. However, suppose the device type is "tablet" for a tablet computer, and the tablet application presentation mode is determined to be even more responsive and stable than the mobile website presentation mode. In this situation, the tablet presentation mode would be selected.

The process 300 selects the presentation mode having presentation mode score indicating a highest quality relative to the quality indicated to the other presentation modes by the other presentation mode scores (306). As described above, the presentation mode score for each presentation mode may be determined from the above signals. A variety of appropriate scoring algorithms can be used to determine presentation mode scores. For example, each presentation mode signal can be quantified, and each presentation mode signal can be weighted according to a scoring algorithm of the form:

$$VMS_i = f(S1_i * W1_i, S2_i * W2_i \ldots Sn_i * Wn_i)$$

where $VMS_i$ is the presentation mode score of the $i^{th}$ presentation mode;

$S1_i \ldots Sn_i$ are quantifications of n presentation mode signals for the presentation mode; and $W1_i \ldots Wn_i$ are corresponding feature weights.

The tuning of the algorithm can be accomplished in a variety of appropriate ways, and the results verified by raters, for example.

The process 300 provides the search results to a user device, wherein the search result referencing the content item having the multiple presentation modes is provided according to the selected presentation mode (308). Examples of such search results are shown in FIGS. 4A and 4B, which are illustrations of search results pages with a different presentation mode selected in each search result page for a particular search result.

Figure 4A:
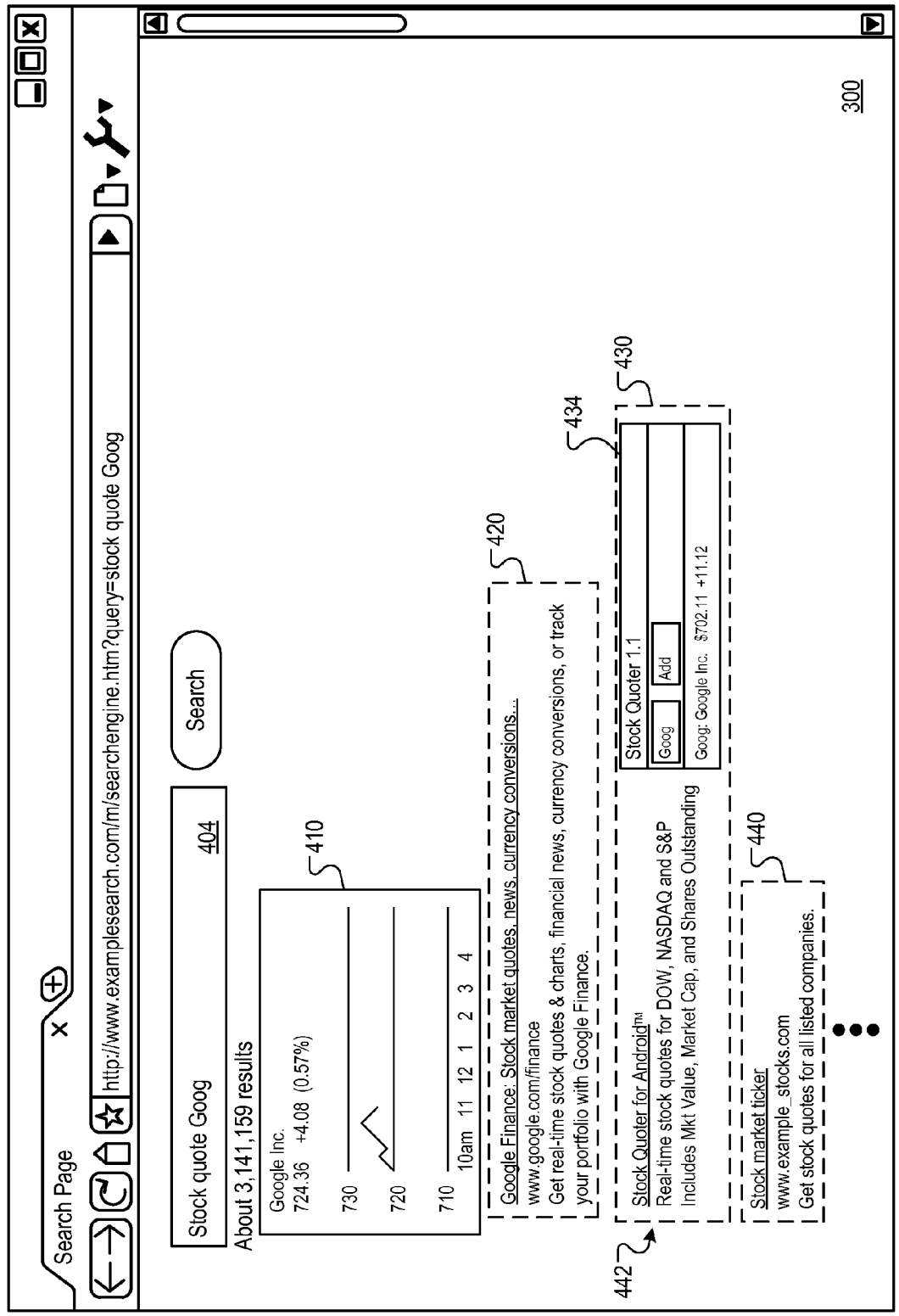
FIGS. 4A and 4B are illustrations of search results pages with a different presentation mode selected in each search result page for a particular search result.
Figure 4B:
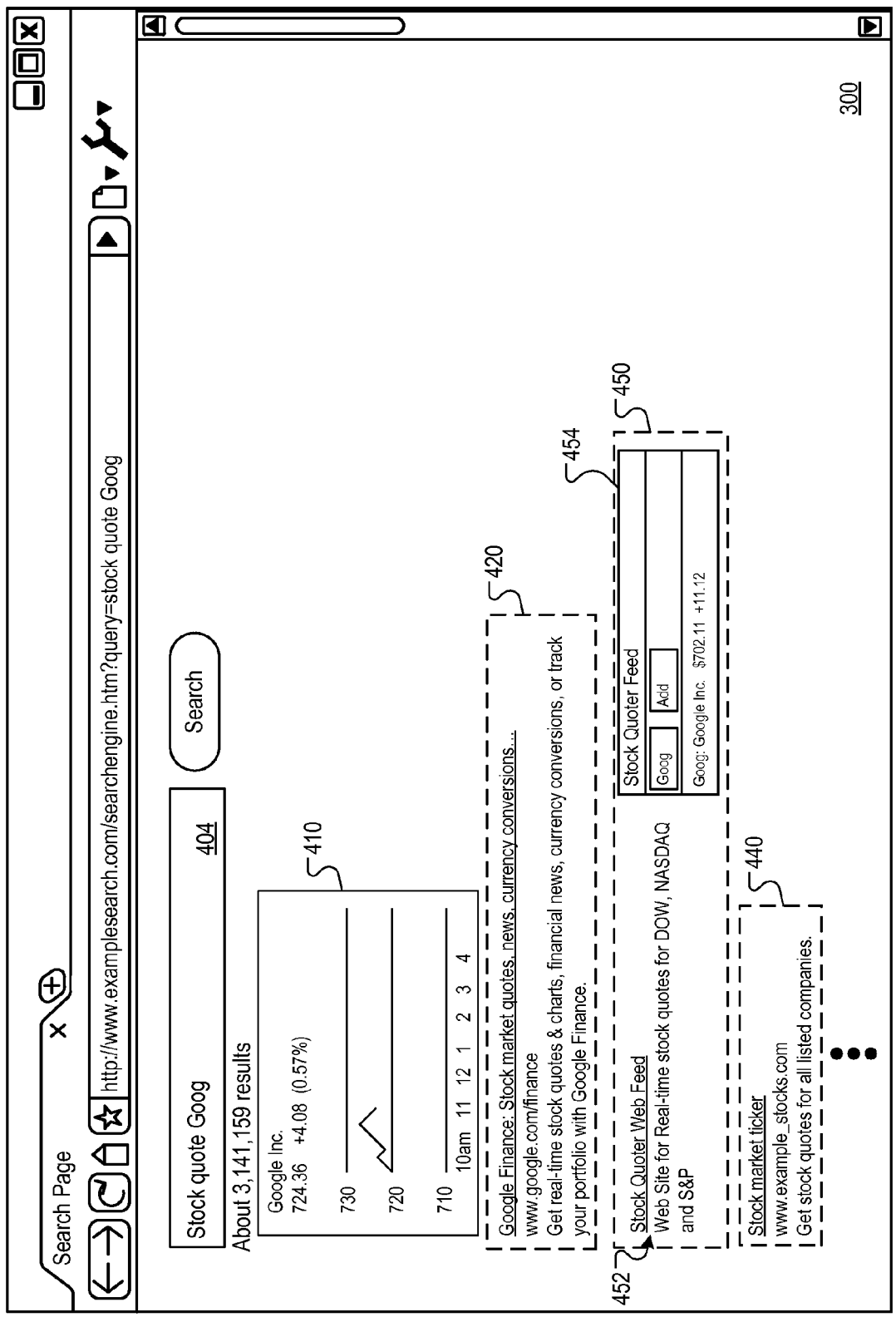

FIG. 4A is an illustration of a search results page 400 that includes a native application search result for a native application ranked against web resources. Displayed in the search results page 400 are search results 410, 420, 430, and 440 that are responsive to the query "Stock quote Goog" displayed in the search input field 404. The search result 410 is a real time search result that is generated, for example, in part from a real time feed. The search results 420 and 440 are web search results generated in response to a search of a web index 112 of resources. Each search result 420 and 440 references a resource that can be rendered in a browser application on a user device and includes a link to the resource, and other data, such as a snippet of text extracted for the referenced resource.

The presentation mode having presentation mode score indicating a highest quality relative to the quality indicated to the other presentation modes by the other presentation mode scores is a native application. Thus, the search result 430 is a native application search result. The search result 430 may include, for example, a snippet 432 of text and an image 434 of an application page. The snippet 434 may include, for example, the name of the native application (Stock Quoter for Andriod™) and text that has been extracted from one or more application pages of the native application. Additional text can also be included, such as text from metadata.

The image 434 may be, for example, an image of a rendered application page. In some implementations, multiple images for a particular application page may be stored, and the image that is most relevant to the query may be selected. For example, as show in FIG. 4 the image 434 includes an image for a stock quote for the Goog symbol, and the image is selected because the search query specifies the Goog symbol.

In FIG. 4B, the search results search results 410, 420 and 440 are the same as in FIG. 4A. However, the search result 450 differs in that the presentation mode for a web page resource with a real time feed has been selected. Thus, the search result 450 includes, for example, a snippet 452 of text from the web page resource and an image 434 of the data provided by the feed.

The difference in the search result 440 of FIG. 4A and 450 in FIG. 4B is based on the presentation mode score. For example, assume the user device from which the environment in FIG. 4A is generated is a mobile device, and the user device from which the environment in FIG. 4B is generated is a tablet device. The presentation mode for a native application for the mobile device may be ranked higher than the presentation mode for the web resource, and thus in FIG. 4A the presentation mode for the native application is provided. However, the tablet device of FIG. 4B may not be able to run the native application, and thus the presentation mode of the web resource is selected.

Similarly, assume at a first time the presentation mode for a native application of may be ranked higher than the presentation mode for the web resource at a first time. However, at a later time a new release of the native application may have stability issues, resulting in the web page resource presentation mode being rated higher than the native application presentation mode at a second time. The illustration of FIG. 4A may correspond to the first time at which the presentation mode for the native application is rated higher, and the illustration of FIG. 4B may correspond to the second time at which the presentation mode for the web resource is rated higher.

Although presentation modes and environment are described above in the context of visual, textual and audio features, a particular presentation environment need not have all of these features. For example, a particular presentation environment may be audio or visual only.

Furthermore, although only one presentation mode for a search result has been shown, in some implementations multiple presentations modes can be shown. For example, it N (e.g., two) highest-ranked presentations modes are scored such that the respective scores are within a threshold, both may be referenced for a particular search result.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:

receiving, by the data processing apparatus, data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the content item, a presentation mode score for the presentation mode comprises:

for each presentation mode, determining a presentation environment installation status for the presentation mode, the presentation environment installation status being indicative of whether an application that facilities the instantiation of the presentation environment defined by the presentation mode is installed on a user device from which the search query was received; and determining the presentation mode score based, in part, on the presentation environment installation status.

2. The computer-implemented method of claim 1, wherein determining, for each presentation mode of the content item, a presentation mode score for the presentation mode comprises:

for each presentation mode, determining a presentation mode selection rate indicative of a selection rate of the search result when presented in the presentation mode; and determining the presentation mode score, in part, based on the presentation mode selection rate.

3. The computer-implemented method of claim 1, wherein determining, for each presentation mode of the content item, a presentation mode score for the presentation mode comprises:

for each presentation mode, determining a presentation environment quality score for the presentation mode, the presentation environment quality score being indicative of a quality of the presentation environment; and determining the presentation mode score, in part, based on the presentation environment quality score.

4. The computer-implemented method of claim 1, wherein determining, for each presentation mode of the content item, a presentation mode score for the presentation mode comprises:

for each presentation mode, determining a user device type of a user device from which the search query was received; and determining the presentation mode score based, in part, on the user device type.

5. The computer-implemented method of claim 4, wherein determining the a presentation mode score based, in part, on the user device type comprises:

for each presentation mode, determining whether the presentation environment of the presentation mode can be instantiated on the user device type; and determining the presentation mode score based, in part, on the determination.

6. A computer-implemented method performed by data processing apparatus comprising one or more computers in data communication, the method comprising:

receiving, by the data processing apparatus, data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the content item, a presentation mode score for the presentation mode, comprises:

for each presentation mode, determining a presentation environment quality score for the presentation mode, the presentation environment quality score being indicative of a quality of the presentation environment; and determining the presentation mode score, in part, based on the presentation environment quality score;

wherein determining a presentation environment quality score for the presentation mode comprises determining an error measure that is a measure of errors that occur on a user device when the presentation environment is instantiated.

7. A system, comprising:

a data processing apparatus; and software stored in non-transitory computer readable storage medium storing instructions executable by the data processing apparatus and that upon such execution cause the data processing apparatus to perform operations comprising:

receiving data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the search result, a presentation mode score for the presentation mode comprises:

for each presentation mode, determining a presentation environment installation status for the presentation mode, the presentation environment installation status being indicative of whether an application that facilities the instantiation of the presentation environment defined by the presentation mode is installed on a user device from which the search query was received; and determining the presentation mode score based, in part, on the presentation environment installation status.

8. The system of claim 7, wherein determining, for each presentation mode of the content item, a presentation mode score for the presentation mode, comprises:

for each presentation mode, determining a presentation mode selection rate indicative of a selection rate of the search result when presented in the presentation mode; and determining the presentation mode score, in part, based on the presentation mode selection rate.

9. The system of claim 7, wherein determining, for each presentation mode of the content item, a presentation mode score for the presentation mode comprises:

for each presentation mode, determining a presentation environment quality score for the presentation mode, the presentation environment quality score being indicative of a quality of the presentation environment; and determining the presentation mode score, in part, based on the presentation environment quality score.

10. The system of claim 7, wherein determining, for each presentation mode of the content item, a presentation mode score for the presentation mode comprises:

for each presentation mode, determining a user device type of a user device from which the search query was received; and determining the presentation mode score based, in part, on the user device type.

11. A system, comprising:

a data processing apparatus; and software stored in non-transitory computer readable storage medium storing instructions executable by the data processing apparatus and that upon such execution cause the data processing apparatus to perform operations comprising:

receiving data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the content item, a presentation mode score for the presentation mode comprises:

for each presentation mode, determining a presentation environment quality score for the presentation mode, the presentation environment quality score being indicative of a quality of the presentation environment; and determining the presentation mode score, in part, based on the presentation mode selection rate;

wherein determining a presentation environment quality score for the presentation mode comprises determining an error measure that is a measure of errors that occur on a user device when the presentation environment is instantiated.

12. A non-transitory computer readable storage medium storing instructions executable by a data processing apparatus and that upon such execution cause the data processing apparatus to perform operations comprising:

receiving data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the content item, a presentation mode score for the presentation mode comprises:

for each presentation mode, determining a presentation environment quality score for the presentation mode, the presentation environment quality score being indicative of a quality of the presentation environment; and determining the presentation mode of the content item, in part, based on the presentation mode quality score;

wherein determining a presentation environment quality score for the presentation mode comprises determining an error measure that is a measure of errors that occur on a user device when the presentation environment is instantiated.

13. A non-transitory computer readable storage medium storing instructions executable by a data processing apparatus and that upon such execution cause the data processing apparatus to perform operations comprising:

receiving data identifying a plurality of content items, each content item corresponding to data determined to be responsive to the query and ranked according to a presentation order, wherein one of the content items has a plurality of presentation modes, each presentation mode being a mode by which the content item is presented and specific to one of an application and a user device type and defining a presentation environment that is instantiated on a user device when a search result for the content item and generated for the presentation mode is selected;

determining, for each presentation mode of the content item, a presentation mode score for the presentation mode, each presentation mode score being an indicator of quality of the presentation mode;

selecting the presentation mode having presentation mode score indicating a highest quality relative to the quality indicated to the other presentation modes by the other presentation mode scores; and providing the search results to a user device for presentation according to the presentation order, each search result referencing a corresponding content item, and wherein the search result for the content item having the plurality of presentation modes is provided according to the selected presentation mode;

wherein determining, for each presentation mode of the content, a presentation mode score for the presentation mode comprises:

for each presentation mode, determining a presentation environment installation status for the presentation mode, the presentation environment installation status being indicative of whether an application that facilities the instantiation of the presentation environment defined by the presentation mode is installed on a user device from which the search query was received; and determine the presentation mode score based, in part, on the presentation environment installation status.

14. The non-transitory computer readable storage medium of claim 13, wherein determining, for each presentation mode of the content item, a presentation mode score for the presentation mode comprises:

for each presentation mode, determining a presentation mode selection rate indicative of a selection rate of the search result when presented in the presentation mode; and determining the presentation mode of the content item, in part, based on the presentation mode selection rate.

15. The non-transitory computer readable storage medium of claim 13, wherein determining, for each presentation mode of the content item, a presentation mode score for the presentation mode comprises:

for each presentation mode, determining a presentation environment quality score for the presentation mode, the presentation environment quality score being indicative of a quality of the presentation environment; and determining the presentation mode of the content item, in part, based on the presentation mode quality score.

16. The non-transitory computer readable storage medium of claim 12, wherein determining, for each presentation mode of the content item, a presentation mode score for the presentation mode comprises:

for each presentation mode, determining a user device type of a user device from which the search query was received; and determining the presentation mode score based, in part, on the user device type.

17. The non-transitory computer readable storage medium of claim 16, wherein generating a presentation mode score based, in part, on the user device type comprises:

for each presentation mode, determining whether the presentation environment of the presentation mode can be instantiated on the user device type; and determining the presentation mode score based, in part, on the determination.

* * * * *